United States Patent
Tuba et al.

[11] 3,761,496
[45] Sept. 25, 1973

[54] PROCESS FOR THE ACYLATION OF 17β-HYDROXYSTEROIDS CONTAINING AN ENOLIZABLE OXO-GROUP

[75] Inventors: Zoltán Tuba; Mária Bor nee Szabó; Károly Molnár; Sándor Görög, all of Budapest, Hungary

[73] Assignee: Richter Gedeon Vegyeszeti Gyar Rt., Budapest, Hungary

[22] Filed: July 6, 1971

[21] Appl. No.: 160,085

[30] Foreign Application Priority Data
July 29, 1970 Hungary................................ RI-399

[52] U.S. Cl........................... 260/397.4, 260/397.5
[51] Int. Cl........................................... C07c 167/28
[58] Field of Search................................. 260/397.4

[56] References Cited
UNITED STATES PATENTS
| | | | |
|---|---|---|---|
| 3,691,212 | 9/1972 | Feather et al.................... | 260/397.4 |
| 3,471,531 | 10/1969 | Campbell et al................. | 260/397.4 |
| 3,515,719 | 6/1970 | Hughes et al.................... | 260/397.4 |

Primary Examiner—Elbert L. Roberts
Attorney—Karl F. Ross

[57] ABSTRACT

This invention relates to the acylation of 17β-hydroxysteroids containing an enolizable oxogroup in the A-ring having the general formula I

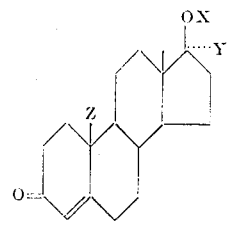

wherein
X represents a straight-chain, branched-chain or cyclic acyl group of one to eight carbon atoms or a haloacyl group of one to three carbon atoms,
Y represents ethynyl, vinyl, allyl group or an alkyl group of one to four carbon atoms, and
Z represents hydrogen group or methyl.

7 Claims, No Drawings

PROCESS FOR THE ACYLATION OF 17β-HYDROXYSTEROIDS CONTAINING AN ENOLIZABLE OXO-GROUP

This invention relates to the acylation of 17β-hydroxysteroids containing an enolizable oxo-group in the A-ring having the general formula I

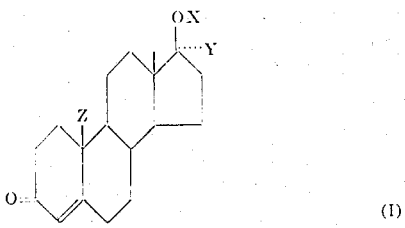

wherein
- X represents a straight-chain, branched-chain or cyclic acyl group of one to eight carbon atoms or a haloacyl group of one to three carbon atoms, -hydroxy-estr-4-en-3-on-17-acetate
- Y represents ethynyl, vinyl, allyl group or an alkyl group of one to four carbon atoms, and
- Z represents hydrogen or methyl.

The above acyl-derivatives possess valuable biological properties, e.g., 17α-ethynyl-17β-acetoxy-estr-4-en-3-on is an orally administrable progestatic agent (USP No. 2,964,537). Moreover, some of the compounds of the general formula I can be used as starting substances for the synthesis of other derivatives having similar biological activity, e.g., 17α-ethynyl-17β-acetoxy-estr-4-en-3-on is employed for the preparation of 17α-ethynyl-17β,3β-dihydroxy-estr-4-en-3β,17β-diacetate, which latter can be used more advantageously in the therapy as the starting substance itself. (The Chemistry and Biology of 17-Substituted Estreme-3β,17β-diols. F. Colton, P. Klimstra: Hormonal Steriods 2, 23–30 /1961/)

There are described several methods in the literature for the acylation of hydroxysteriods. The acylation of those compounds having primary or secondary hydroxy groups — with the exception of some derivatives, e.g., the allyl compounds or the sterically hindered substances — can be accomplished in the presence of an acid or base catalyst under mild reaction conditions. The reaction proceeds readily and practically without formation of by-products.

Those compounds containing tertiary hydroxy groups can also be acylated in the presence of an acid or base catalyst; the reaction is, however, conducted under more severe conditions, e.g., at a temperature above 100°C or employing a longer reaction time. If the starting substance contains sensitive groups — e.g., ethynyl or oxo group — this reaction is accompanied by formation of by-products. If the starting substance contains an enolizable oxo-group, a so-called anol-diacetate can also be formed, which can only be converted to the desired product by selective hydrolysis.

The acylation of tertiary hydroxysteriods containing enolizable oxo-groups e.g. 17α-ethynyl-17β-hydroxy-estr-4-en-3-on (noretysteron), 17α-methyl-17β-hydroxy-androst-4-en-3-on (methyltestosterone) or 1-7α-methyl-17β-hydroxy-estr-4-en-3-on (19-nor-methyltestosterone) has been carried out according to the literature by the following methods:

According to German Pat. Nos. 1,017,166, and 1,126,384, Brit. Pat. Nos. 841,411, 887,721, 922,877, Belgian Pat. No. 619,037, French Pat. No. 1,349,991, and Dutch Patent Application No. 65,05,879, acylation is carried out in the presence of a base catalyst (pyridine). According to the patent specifications listed above, acetylation is carried out with acetic anhydride at a temperature above 100 °C with a reaction time of 0.5 to 16 hours. The obtained products can only be used after several recrystallizations or after other methods of purification, and the yield does not exceed 80 percent in any of the cases.

According to the method disclosed in German Pat. No. 1,017,166 and U.S. Pat. No. 1,964,537, norestisterone and some other steriods containing a tertiary hydroxy group in the 17 position are acylated in the presence of an acid catalyst. According to the above patent specifications, the reaction is carried out in an acid anhydride or in a mixture of an acid anhydride and benzene in the presence of p-toluenesulphonic acid catalyst at room temperature or elevated temperatures. If the starting substance contains enolizable oxo-group, the synthesis of the corresponding 3-oxo-17-acyloxy compound can only be carried out in two steps, e.g., estr-3,5-dien-3,17β-diol-17α-ethynyl-3,17-diacetate formed at the acetylation of 17α-ethynyl-17β-hydroxy-estr-4-en-3-on is converted with selective hydrolysis to the corresponding 17-ester derivative having free 3-oxo-group.

U. S. Pat. No. 3,404,150 discloses a process for the preparation of estr-3,5-dien-3,17β-diol-17α-ethynyl-3,17-diacetate. According to this latter method, enoldiacetate is synthetized in the first step in the presence of iodine catalyst in acetic anhydride, and the obtained product is hydrolized in metanol in the presence of concentrated hydrochloric acid.

According to the method disclosed in U.S. Pat. No. 3,408,371, acetylation is carried out by a way differing in principle from the former ones, i.e., the reaction is carried out without any catalysts in the mixture of acetic anhydride and xylene. The reaction mixture is subjected to azeotropic distillation at a temperature above 100 °C.

According to other known methods, acetylation is carried out in the presence of calcium carbide or calcium hydride at elevated temperatures, i.e., at the boiling point of acetic anhydride (Monatshefte fur Chemie 97, 62 /1966/, Journal fur Praktische Chemie 311, 671 /1969/).

Among the processes listed above the esterification in the presence of a base catalyst (generally of pyridine) can only be carried out at a temperature above 100 °C and the reaction requires several hours. The product is separated from the reaction mixture by extraction. Analytically pure substances, or substances usable in further syntheses can only be obtained after several purification steps with a maximal yield of 80 percent. This can be explained by the fact, that the ethynyl group, for instance, enters into side-reactions during the long lasting treatment at elevated temperature, and about 10 percent of enol-diacetate appears in the end-product as contamination.

If the acetylation is carried out in the presence of p-toluenesulphonic acid or iodine catalyst, enoldiacetate is formed in the first step, and can be converted to the desired compound containing free oxo-group in the 3-position by a subsequent hydrolysis. As the reaction can be carried out in two steps, the yield is about 70 percent. A further disadvantage of the above method is, that the product can be isolated by difficult and time-consuming methods.

The product can be obtained with better yields according to the method described in U.S. Pat. No. 3,408,371, this method is, however, extremely sensitive to the reaction conditions. Namely, if the mixture contains tracs of mineral acids or the organic acid — e.g., acetic acid — is enriched in the mixture in the course of the azeotropic distillation (in most of the cases this latter fact cannot be avoided), side-reactions take place at the elevated temperature. Accordingly, this reaction can only be carried out with difficulty on an industrial scale.

The acetylation in the presence of calcium hydride or calcium carbide is carried out at elevated temperatures and requires several hours. The end-product can be isolated by extraction, and analytically pure product or a substance usable in further syntheses can only be obtained after several purification steps. Besides the formation of the so-called enoldiacetate, the reaction is accompanied by several other side-reactions.

Now we have found, unexpectedly, that the desired end-products can be prepared easily in a single step at room temperature with almost quantitative yield, if the acylation is carried out in glacial acetic acid or in an other inert solvent (.e.g., in chloroform) in the presence of zinc chloride, ferric chloride, antimony trichloride, antimony pentachloride, stannic chloride and/or gaseous hydrochloric acid, and the reagent acetic anhydride or other organic acid anhydrides are used in excess of several moles. The reaction is conducted preferably in the presence of gaseous hydrochloric acid.

According to the present invention, compounds of the general formula I can be prepared as follows:

A compound of the general formula II

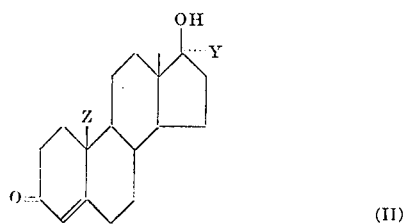

(II)

wherein Y and Z have the meanings defined above, is dissolved or suspended at room temperature in glacial acetic acid or in an other inert solvent, e.g., in chloroform, and an organic acid anhydride, e.g., acetic anhydride, propionic anhydride, trimethylacetic anhydride, cyclopentylpropionic anhydride, chloroacetic anhydride and, as well as a catalytic amount of Lewis acid (e.g., zinc chloride, ferric chloride, stannic chloride, stannous chloride, antimony trichloride or antimony pentachloride) is added to the reaction mixture. The mixture is permitted to stand for two hours at room temperature, thereafter about 1/50 part by volume of glacial acetic acid containing 4 to 5 percent of dissolved hydrochloric acid, and an amount of water corresponding to the excess amount of acetic anhydride plus a slight excess, thereover, are added to the mixture. The mixture is permitted to stand for an additional 2 to 3 hours, thereafter it is added dropwise in water. The separated substance is filtered off, washed thoroughly with water and dried.

According to a particularly preferred method of the invention, a catalytic amount of a mineral acid or an organic sulphonic acid — preferably glacial acetic acid containing hydrochloric acid — is added to the compound of the general formula II dissolved or suspended in glacial acetic acid simultaneously with the addition of the Lewis acid catalyst. In this latter case the reaction time shortens to about 5 to 10 minutes. After 10 minutes of standing, an amount of water equivalent to or slightly exceeding of the excess amount of acetic anhydride is added to the mixture, the mixture is permitted to stand at room temperature for 2 to 3 hours, thereafter it is added dropwise in water. The separated product is filtered off, washed and dried.

Accordingly this invention relates to the acylation of 17$\beta$-hydroxysteriods containing an enolizable oxo-group in the A-ring, having the general formula I — wherein X, Y and Z have the meanings stated above — by reacting a compound of the general formula II — wherein Y and Z have the meanings stated above — with an organic acid anhydride, in which a compound of the general formula II is acylated in the presence of a Lewis acid and/or an other acid (preferably acetic acid containing hydrochloric acid), the excess of the acid anhydride is decomposed, the small amount of enoldiacetate is selectively hydrolized, and the thus-obtained compound of the general formula I is separated from the mixture according to known techniques.

According to the method of the invention the compound of the general formula I can be prepared easily in a single step at room temperature with a yield over 95 percent. The purity grade of the obtained compounds is very high, accordingly they can be used directly, without any further purification steps. The method of the present invention can also be employed for the acylation of other 17$\beta$-hydroxysteriods containing no enolizable oxo-group in the A-ring. Such compounds are e.g., the 17$\alpha$-ethynyl-17$\beta$-hydroxy-5(10)-en-3-on, 17$\alpha$-ethynyl-1,3,5(10)-trien-3$\beta$,17$\beta$-diol and 17$\alpha$-ethynyl-estr-4-en-17$\beta$-ol.

The invention is substantially based on the fact, that catalytic amounts of Lewis acids enhance the heterolysis of the acid anhydride molecule and form an active complex with the acyl cation, accordingly the reaction is accelerated. The catalytic amount of hydrochloric acid also accelerates the reaction preferably in the presence of Lewis acids and, on the other hand, after the aqueous decomposition of the excess anhydride it selectively hydrolizes the enoldiacetates formed in a small amount in the reaction to the corresponding 3-oxo-17-acyloxy compounds.

The advantages of the present method over the are are the followings:

The reaction proceeds at room temperature; tertiary hydroxy-derivatives containing enolizable oxo-groups can be acylated with a yield of at least 95 percent; the obtained product is of high purity; the reaction can be carried out easily and can be employed advantageously even on an industrial scale.

The method of the invention is elucidated in greater detail in the following Examples. The Examples are given for the purpose of illustration and not by way of limitation.

Example 1

17$\alpha$-Ethynyl-estr-4-en-3-on-17$\beta$ -ol-17-acetate a. 5 of 17α-ethynyl-17β-hydroxy-estr-4-en-3-one are suspended in 50 ml. of glacial acetic acid and 10 ml. of acetic anhydride and 1 g. of zinc chloride are added to the suspension at room temperature under vigorous stirring. After some minutes of stirring a clear solution is obtained. The reaction mixture is stirred at room temperature for 2.5 hours, thereafter 1 ml. of glacial acetic acid containing 4 percent of dissolved hydrochloric acid and 3 ml. of water are added. The mixture is stirred for additional two hours, then it is added dropwise into 500 ml. of ice water. The separated white 17-α-ethynyl-estr-4-en-3-on-17β-ol-17-acetate is filtered off, washed thoroughly with water and dried. Yield: 5.5 g. (96 percent). m.p.: 158°–160°C.

Analysis:
Calculated: C 77.61 % H 8.29 % O 14.10 %
Found: C 77.57 % H 8.35 % O 14.15 % $(\alpha)_D^{25} = -29°$ (chloroform).

b. 250 g. of 17α-ethynyl-17β-hydroxy-estr-4-en-3-on are suspended in 2,500 ml. of glacial acetic acid and 500 ml. of acetic anhydride, 50 ml. of glacial acetic acid containing 4 percent dissolved hydrochloric acid and 50 g. of zinc chloride are added to the suspension at room temperature under vigorous stirring. After 6 to 10 minutes of stirring a clear solution is obtained. The reaction mixture is stirred for additional 10 minutes, thereafter 150 ml. of water are added to the mixture within 10 to 15 minutes in such a rate that the temperature of the mixture does not exceed 40 °C. The mixture is left stand for two hours at room temperature, thereafter it is added dropwise into 25 l. of ice water. The separated substance is filtered off, washed acid-free with water and dried. 281 g. (98.5 percent) of 17α-ethynyl-17β-hydroxy-estr-4-en-3-on-17-acetate are obtained, m.p.: 159°–161 °C. $(\alpha)_D^{25} = -29°$ (in chloroform).

c. 5 g. of 17α-ethynyl-17β-hydroxy-estr-4-en-3-on are suspended in 50 ml. of glacial acetic acid and 10 ml. of acetic anhydride, 1 ml. of glacial acetic acid containing 4 percent of dissolved hydrochloric acid and 1 g. of ferric chloride are added to the suspension at room temperature under vigorous stirring. After some minutes, when a clear solution is obtained, 3 ml. of water are added to the mixture in such a rate that the temperature of the mixture should not exceed 40 °C. The mixture is permitted to stand at room temperature for a further 2.5 hours then it is added dropwise into 500 ml. of ice water. The separated 17α-ethynyl-17β-hydroxy-estr-4-en-3-on-17-acetate is filtered off, washed thoroughly with water and dried. 5.6 g. (98 percent) of the end-product are obtained, mp.: 157°–159 °C. $(\alpha)_D^{25} = -28.5°$ (in chloroform).

Example 2

17α-Ethynyl-17β-hydroxy-estr-4-en-17-acetate 5 g. of 17α-ethynyl-17β-hydroxy-estr-4-en are dissolved in 50 ml. of glacial acetic acid and 10 ml. of acetic anhydride, 0.5 g. of zinc chloride and 1 ml. of glacial acetic acid containing 4 percent dissolved hydrochloric acid are added to the solution at room temperature under vigorous stirring. The mixture is permitted to stand at room temperature for 10 minutes, thereafter it is added dropwise into 500 ml. of ice water. The separated 17α-ethynyl-17β-hydroxy-estr-4-en-17-acetate is filtered off, washed thoroughly with water and dried. Yield: 5.6 g. (97.5 percent). m.p.: 158°–161 °C.

Analysis:
Calculated: C 80.93 % H 9.26 % O 9.8 %
Found: C 80.76 % H 9.32 % O 10.00%

Example 3

17α-Methyl-17β-hydroxy-estr-4-en-3-on-17-acetate 25 g. of 17α-methyl-17β-hydroxy-estr-4-en-3-one are suspended in 250 ml. of glacial acetic acid and 40 ml. of acetic anhydride, 5 ml. of glacial acetic acid containing 4 percent dissolved hydrochloric acid and 2 g. of antimony trichloride are added to the suspension. After about 30 minutes of stirring a clear solution is formed. The mixture is stirred for additional 10 minutes, then the excess of the acetic anhydride is decomposed with 15 ml. of water. The mixture is permitted to stand at room temperature for 2 hours, thereafter it is added dropwise into 2.5 l. of ice water. The separated substance is filtered off, washed thoroughly with water and dried. 27.8 g. (97 percent) of 17α-methyl-17β-hydroxy-estr-4-en-3-on-17-acetate are obtained, m.p.: 100°–103 °C. $(\alpha)_D^{25} = +21°$ (in dioxane)

Analysis:
Calculated: C 76.32 % H 9.15 % O 14.53 %
Found: C 76.20 % H 9.21 % O 14.55 %

Example 4

17α-Methyl-17β-hydroxy-androst-4-en-3-on-17-acetate 10 g. of 17α-methyl-17β-hydroxy-androst-4-en-3-on are dissolved at room temperature in 100 ml. of glacial acetic acid, then 8 ml. of acetic anhydride, 0.5 g. of zinc chloride and 2 ml. of glacial acetic acid containing 5 percent of dissolved hydrochloric acid are added to the solution. The mixture is stirred for 15 minutes at room temperature, thereafter the excess of acetic anhydride is decomposed with 6 ml. of water. The water is added in such a rate that the temperature of the mixture should not exceed 40 °C. The mixture is stirred for additional 3 hours, thereafter it is added dropwise into 1,000 ml. of ice water. The separated 17α-methyl-17β-hydroxy-androst-4-en-3-on-17-acetate is filtered off, washed acid-free with water and dried. Yield: 11 g. (96.2 percent). m.p.: 173°–175 °C. $(\alpha)_D^{25} = +89°$ (in chloroform).

Analysis:
Calculated: C 76.70 % H 9.36 % O 13.93 %
Found: C 76.85 % H 9.45 % O 13.85 %

Example 5

17α-Ethynyl-estr-4-en-3-on-17β-ol-17-acetate 5 g. of 17α-ethynyl- β-hydroxy-estr-4-en-3-on are dissolved in 50 ml. of chloroform and 10 ml. of acetic anhydride and 1 g. of zinc chloride are added to the solution at room temperature under stirring. The reaction mixture is stirred for 2 hours at room temperature, thereafter 1 ml. of chloroform containing 4 percent of dissolved hydrochloric acid and 6 ml. of water are added. The mixture is stirred for additional 2 hours, thereafter it is diluted with 100 ml. of chloroform. The mixture is washed acid-free with water and dilute aqueous sodium bicarbonate solution, dried and evaporated. The residue is triturated with n-hexane, the solids are filtered off and dried. 5.2 g. (91 percent) of 17-α-ethynyl-estr-4-en-3-on-17β-ol-17-acetate are obtained, m.p.: 158°–160 °C. $(\alpha)_D^{25} = 28.7°$ (in chloroform). What we claim is:

1. A process for producing a compound having the formula

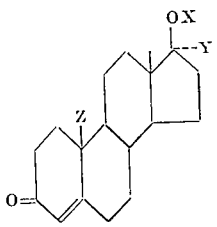

wherein
X is straigh-chain, branched-chain or cyclic acyl of one to eight carbon atoms, Y is ethynyl, vinyl, allyl group or alkyl of one to four carbon atoms, and Z is hydrogen atom or methyl group, by acylating a 17β-hydroxy steriod having an enolizable OXO group in the A-ring and of the formula

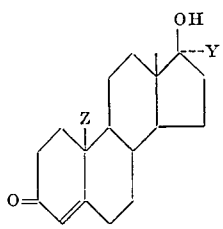

wherein Y and Z have the meanings defined above, in a single step with an organic acid anhydride selected from the group which consists of acetic anhydride, propionic anhydride, trimethylacetic anhydride and cyclopentylpropionic anhydride in the presence of a catalytically effective amount of a Lewis acid selected from the group which consists of zinc chloride, ferric chloride, stannic chloride, stannous chloride and antimony chlorides, and a catalytically effective amount of another acid selected from the group which consists of acetic acid containing hydrochloric acid and organic suophonic acid, decomposing excess of the acid anhydride by addition of water to the reaction system, hydrolysing any enoldiacetate in the reaction system by maintaining an excell of the last mentioned acid therein after hydrolysis, and separating the product of the first mentioned formula from the resulting mixture by crystallization.

2. The process defined in claim 1 wherein the acylation is carried out in a solvent selected from the group which consists of acetic acid and chloroform.

3. The process defined in claim 2 wherein the acylation is carried out at room temperature.

4. The process defined in claim 3, in which the acylated compound is 17 -ethynyl-17 -hydroxy-estr-4-en-one.

5. The process defined in claim 3, in which the acylated compound is 17 -methyl-17 -hydroxy-estr-4-en-3-one.

6. The process defined in claim 3, in which the acylated compound is 17 -methyl-17 -hydroxy-androst-4-en-3-one.

7. The process defined in claim 3, in which the acylated compound is 17 -ethynyl-17 -hydroxy-5(10)-en-3-one, 17 -ethynyl-1,3,5(10)-trien-3, 17 -diol or 17 -ethynyl-estr-4-en-17 ol.

* * * * *

UNITED STATES PATENT OFFICE
CERTIFICATE OF CORRECTION

Patent No. 3,761,496      Dated September 25, 1973

Inventor(s) Zoltan Tuba, Maria Bor and Karoly Molnar

It is certified that error appears in the above-identified patent and that said Letters Patent are hereby corrected as shown below:

Column 6, line 52, read the compound identification as if -- 17 -- appears after "ethynyl-" and before the β. In each of claims 4-6, the compound identification is to be read as if an -- α -- appears after the first "17" and after a -- β -- after second "17".

Claim 7, line 2, (col. 8, line 30) the compound is to be read as if an -- α -- appears after the first "17" and a -- β -- appears after the second "17".

Claim 7, line 3, (col. 8, line 3), the line should read -- 3-one,17α-ethynyl-1-1,3,5(10)-trien-3β,17β-diol or 17α. -- line 4 (col. 8, line 4), a -- β -- should appear after "17".

Signed and sealed this 1st day of July 1975.

(SEAL)
Attest:

RUTH C. MASON
Attesting Officer

C. MARSHALL DANN
Commissioner of Patents
and Trademarks